United States Patent

[11] 3,557,859

[72] Inventor Ronald Markey Brenhouse
528 Green St., Cambridge, Mass. 02138
[21] Appl. No. 603,294
[22] Filed Dec. 20, 1966
[45] Patented Jan. 26, 1971

[54] VARIABLE PRESSURE PNEUMATIC VEHICLE TIRE
8 Claims, 10 Drawing Figs.
[52] U.S. Cl. .................................................... 152/330
[51] Int. Cl. ................................................. B60c 23/00
[50] Field of Search ......................................... 152/330

[56] References Cited
UNITED STATES PATENTS
487,874  12/1892  Elliott .......................... 152/330
2,981,305  4/1961  Reed ............................ 152/330

Primary Examiner—Arthur L. La Point
Attorney—Paul J. Sutton

ABSTRACT: A tire including speed responsive means for varying effective tire pressure in proportion to vehicle speed and a tube having a variable dimension in combination with speed responsive means for varying said dimension in proportion to speed.

PATENTED JAN26 1971    3,557,859

VARIABLE PRESSURE PNEUMATIC VEHICLE TIRE

This invention relates to a vehicle tire in which effective pressure is varied in proportion to speed. This invention further relates to a tube having a speed variable dimension which may be utilized, particularly, in a tire for causing effective pressure variation in proportion to speed.

A principal object of this invention is to provide a tire which is speed compensating to provide relatively higher and lower effective pressures at respectively higher and lower vehicle speeds. It is a further object of this invention to obtain the several advantages inherent in such a tire, e.g., improved road handling and tire life, together with minimum tire heating and increased safety at high speeds, combined with increased tire contact area for improved braking performance and for improved performance in mud, slush and snow and on ice at low speeds. A further object is to provide a tire supporting member operative upon loss of tire pressure effectively to support the tire as in an inflated condition, thereby to improve tire safety and to mitigate tire damage on such loss of tire pressure. Still another object of this invention is to provide a tube having a speed-compensating dimension for use, particularly, in such a tire to provide the desired speed-compensating pressure. Still another object is to provide the tube design aforesaid which may itself be used as a tire having a variable outer diameter thereby to vary relative engine and wheel r.p.m. as speed varies.

In general, one feature of the invention is a tire in combination with means for varying effective tire pressure in proportion to vehicle speed. Another feature of the invention is a tube having a variable outer dimension in combination with means for varying such dimension in proportion to vehicle speed. Preferably, the tire is provided with such a tube for varying pressure. Preferably, also, the variable dimension of the tube is its outer diameter.

Other object, features and advantages of this invention will be apparent to those skilled in the art from the following detailed description thereof together with the accompanying drawings in which:

FIG. 1 is a partly diagrammatic isometric view of a tube according to the invention;

FIGS. 2—4 are reduced partly diagrammatic, partly sectional side views of a tire in combination with the tube of FIG. 1 showing the tire and tube under different conditions;

Figure 1:
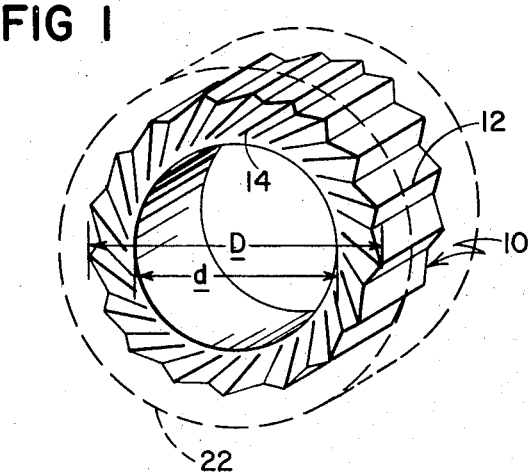
Figure 2:
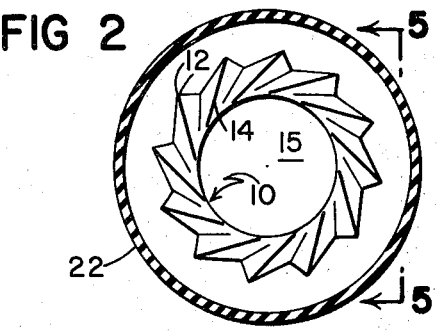

With reference to FIGS. 1 and 2 of the drawings, an annular tube 10 is provided which has a variable outer diameter D. The tube 10 is made of strong, lightweight, flexible material such as rubber, vinyl or the like. Provision for a variable outer diameter D is made by providing a plurality of axially extending pleats 12 about the outer circumference of the tube 10 connecting with a plurality of pleats 14 positioned on the sides of tube 10 generally radially extending when tube 10 is fully inflated as in FIG. 4. The inner circumference of tube 10 may be open, if sealed when mounted on a wheel 15, or may be closed, i.e., integral with the sides of the tube 10. In any event the inner diameter $d$ of tube 10 is such that the tube 10 is secured to wheel 15 by partial inflation. The pleats 12,14 permit the tube 10 to expand and collapse in accordion fashion, FIGS. 2—4. The radial pleats 14 pivot unidirectionally at the inner circumference of tube 10 for such expansion and collapse.

Figure 6:
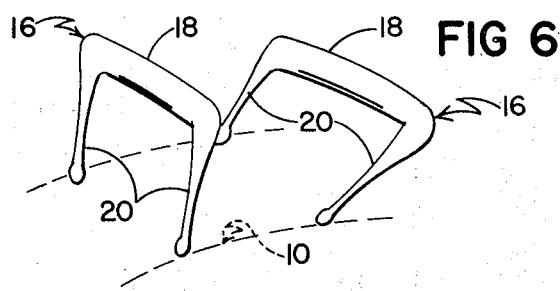
FIGS. 6 and 7 are enlarged isometric views of alternate embodiments of weighting members utilized in the tube.
Figure 7:
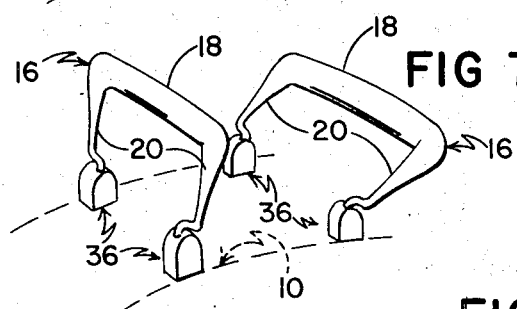

Speed responsive means 16 are provided for varying the outer tube diameter D in proportion to speed. As shown in FIGS. 6 and 7, such means may be U-shaped metal weighting members 16 molded into tube 10 with their bases 18 in axial pleats 12 and their legs 20 in radial pleats 14. One member 16 is provided in each full pleat in tube 10 and the legs 20 of members 16 extend the length of the radial pleats 14 from the outer diameter D to the inner diameter $d$ of the tube 10.

Figure 3:
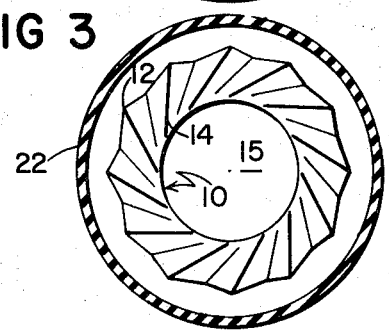
Figure 4:
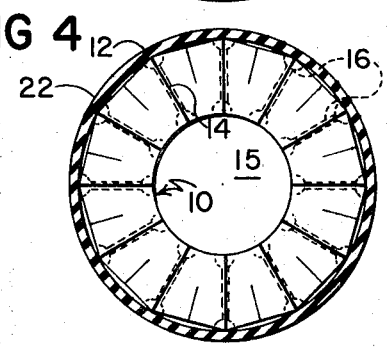
Figure 5:
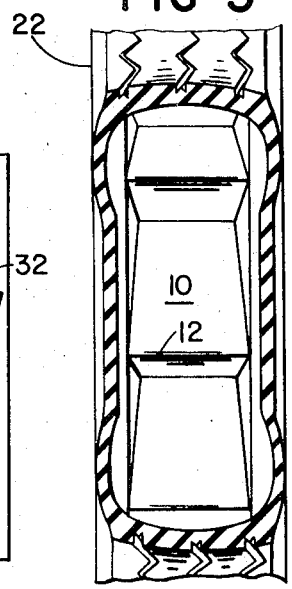
FIG. 5 is a view along the line 5–5 of FIG. 2.
Figure 10:
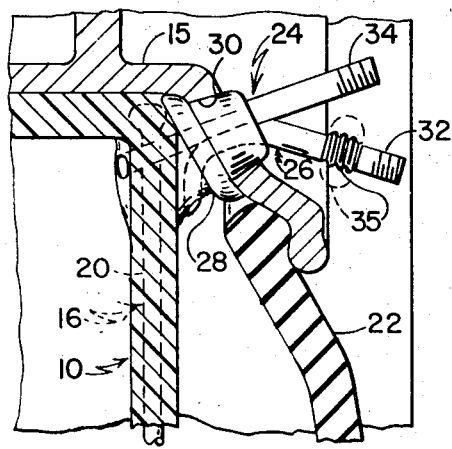
FIG. 10 is an enlarged sectional view of a valve for use with a tire and tube according to the invention.

Such a tube 10 may be employed in a tubeless-type tire 22, as illustrated in FIGS. 2—5, to provide speed responsive pressure adjusting means in the tire 22. A tube 10 is mounted on a wheel 15 within a conventionally mounted tubeless tire 22, as shown, the tube 10 and tire 22 defining two separate air tight chambers. Preferably, as shown in FIG. 5, tube 10 has an axial dimension less than that of the tire 22 on the inside thereof, to permit air to be introduced to tire 22 without interference, and tube 10 has a maximum outer diameter D approximately equal to the maximum diameter of the tire 22 on the inside thereof. A valve member 24, as shown in FIG. 10, is is provided for pressurizing both tube 10 and tire 22. Valve member 24 has a divided stem 26, one half of which communicates with the interior of tire 22 and the other half of which is connected to tube 10 for communication with the interior thereof. The base 28 of stem 26 is enlarged to provide a seal at the valve aperture 30 of wheel 15. At the outer end of valve member 24, stem 26 diverges to provide separate air inlet valve stems 32, 34 for tube 10 and tire 22. Inlet valve 32 stem for tire 22 includes an expandable elastomeric diaphragm 35 outside wheel 15 and, additionally, is flexible to permit its insertion through aperture 30.

Figure 8:
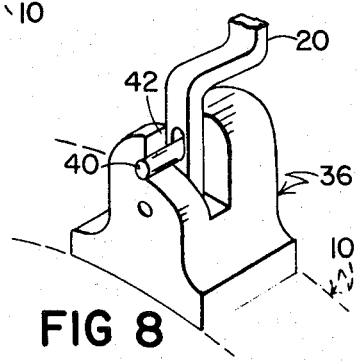
FIG. 8 is an enlarged isometric view of a locking member utilized in connection with the weighting member of FIG. 7.

In some applications, i.e., to provide extra support for tire 22 after a blowout of the like, it may be desired to provide locking means for locking legs 20 in a radial position when they move to that position. In that event, weighting members 16 of the form shown in FIG. 7 may be utilized in which legs 20 are doglegged inwardly, out of pleats 14 and are provided with locking members 36 at their ends. Locking members 36 comprise posts radially supported at their bases in the portion of tube 10 along the inner circumference thereof, as shown in FIG. 8. At the other end of post 36 legs 20 are mounted on pivots 38. Spring-loaded bearings 40 in legs 20 are provided to engage detents (not shown) in posts 36 when the legs 20 are in radial position. Bearing surfaces 42 on posts 36 limit the direction of leg movement.

Figure 9:
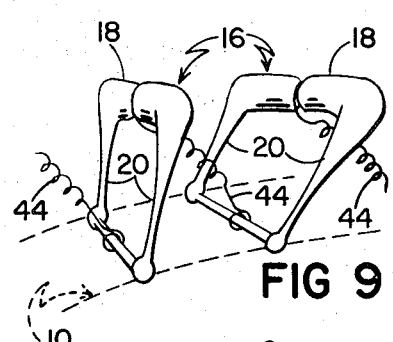
FIG. 9 is an enlarged isometric view of weighting members having biasing means.

In some applications, also, e.g., if the tube 10 is utilized as a tire to prevent pressure on one side from causing ballooning on the other side of the tube 10, or if it simply is desired to assure the unidirectional movement of pleats 14, or to provide greater initial pressure in tube 10 than in tire 22, tube 10 may be biased toward its inner diameter $d$. Biasing means 44 for this purpose in the form of tension springs 44, shown in FIG. 9, may be interconnected between legs 20 of one member 16 and the base 18 of an adjacent member 16.

In operation, the tube 10, in a collapsed condition, is mounted on a wheel 15 and valve 24 is positioned through aperture 30. A predetermined air pressure is then introduced into tube 10 partially inflating the tube and securing it to wheel 15. Thereafter, as wheel 14 is rotated, centrifugal force moves member 16 outwardly increasing the outer diameter of the tube 10. In a tire 22, which is also mounted on wheel 14 and which is separately pressurized through valve stem 32, the effective tire pressure increases as the tube diameter increases thereby compressing the air in the chamber defined between tube 10 and tire 22, as shown in FIG. 3, and vice versa. In the event of a tire blowout, pressure in tube 10 causes tube 10 to expand to its full diameter to support tire 22, as shown in FIG. 4, members 16 providing additional support particularly if provided with locking members 26 which hold members 16 in radial positions on expansion of tube 10 to full diameter. As speed decreases, in normal operation, differential pressure and/or biasing means 44 cause tube diameter to contract with unidirectional movement of pleats 14. In a tire 22, diaphragm 35 may be readily observed to assure that tire 22 is not being supported only by tube 10. Thus, if tire 22 is properly pressurized, diaphragm 35 will be swollen, otherwise it will be collapsed. As shown in FIG. 2, the tube 10 may be mounted with radial pleats 14 uniformly directed toward the direction of rotation of wheel 15. This immediately causes tire pressure reduction and increased surface contact between tire 22 and a road on braking as the momentum of weighting members 16 carries them forward to pivot pleats 14 at the inner circumference of tube 10, which, together with reduced centrifugal force, results in reduction of tube diameter. However, the principal advantages of this invention may be obtained regardless of the direction in which pleats 14 are mounted.

Other embodiments of this invention will occur to those skilled in the art which are within the scope of the following claims.

I claim:

1. Apparatus for use with a vehicle wheel, comprising a tube having a variable outer diameter, said outer diameter including pleats, and speed responsive means associated with said tube for varying said outer diameter as a function of the rotary speed of said vehicle wheel, said speed responsive means including means pivotally mounted in said tube for expanding said tube outer diameter by centrifugal force upon rotation of said vehicle wheel.

2. Apparatus according to claim 1, wherein said tube is generally axially pleated on said outer diameter and generally radially pleated on the sides thereof, said diameter being variable on pivotal movement of the pleats on said sides at positions remote from said outer diameter.

3. Apparatus according to claim 1, further including biasing means interconnected with said outer diameter for biasing said outer diameter away from its greatest extent.

4. Apparatus for use with a vehicle wheel, comprising a wheel, responsive means associated with said tire for varying effective pressure in said tire as a function of the rotary speed of said vehicle wheel said responsive means being adapted to volumetrically vary the space within said tire as a function of the rotary speed of said wheel and including a tube having a variable outer diameter having transversely extending pleats and further including side portions which have generally radial pleats, speed responsive means associated with said tube for varying said outer diameter as a function of the rotary speed of said vehicle wheel, said speed responsive means including weight means pivotally mounted in said tube for expanding said tube outer diameter by centrifugal force upon rotation of said vehicle wheel.

5. Apparatus according to claim 4, wherein said outer diameter has a maximum extent approximately equal to the maximum diameter on the inside of said tire.

6. Apparatus according to claim 4, wherein said weight means comprise a plurality of U-shaped members each having their bases extending transversely across said tube outer diameter and each having their legs extending generally radially along said side portions to an inner diameter of said tube, said legs having a length equal to the distance between said inner diameter and the maximum extent of said tube outer diameter.

7. Apparatus according to claim 6, further including biasing means connected to said weight means biasing said weight means away from a radially extending position of said legs.

8. Apparatus according to claim 6, further including locking means connected to said legs for locking said legs on movement thereof to a radial position.